United States Patent
Zhao

(10) Patent No.: US 12,177,789 B2
(45) Date of Patent: Dec. 24, 2024

(54) METHOD AND APPARATUS FOR ALLOCATING PATH LOSS FOR POWER CONTROL

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 17/774,369

(22) PCT Filed: Nov. 6, 2019

(86) PCT No.: PCT/CN2019/116036
§ 371 (c)(1),
(2) Date: May 4, 2022

(87) PCT Pub. No.: WO2021/087815
PCT Pub. Date: May 14, 2021

(65) Prior Publication Data
US 2022/0369239 A1    Nov. 17, 2022

(51) Int. Cl.
*H04W 52/24* (2009.01)
(52) U.S. Cl.
CPC .................................. *H04W 52/242* (2013.01)
(58) Field of Classification Search
CPC ............. H04W 52/146; H04W 52/225; H04W 52/228; H04W 52/242; H04W 52/383; H04W 76/14; H04W 92/18
See application file for complete search history.

(56) References Cited

U.S. PATENT DOCUMENTS

| | | | | |
|---|---|---|---|---|
| 2013/0130738 A1* | 5/2013 | Cherian | .............. | H04W 52/285 455/522 |
| 2021/0410084 A1* | 12/2021 | Li | ......................... | H04W 52/265 |
| 2022/0110067 A1* | 4/2022 | Ryu | ...................... | H04W 24/08 |
| 2022/0248342 A1* | 8/2022 | Zhao | ................... | H04W 52/383 |

(Continued)

FOREIGN PATENT DOCUMENTS

| | | |
|---|---|---|
| CN | 104349443 A | 2/2015 |
| EP | 3931984 A1 | 1/2022 |
| EP | 4035319 A1 | 8/2022 |

(Continued)

OTHER PUBLICATIONS

European Patent Application No. 19951543.8 Search Report dated Apr. 19, 2024, 6 pages.

(Continued)

*Primary Examiner* — Nguyen T Vo
(74) *Attorney, Agent, or Firm* — Cozen O'Connor

(57) ABSTRACT

A path loss calculation method and apparatus for power control. The method includes determining a target transmit power value according to at least one transmit power value used during direct unicast communication with a receiver device; receiving a current target reference signal received power (RSRP) value returned by the receiver device, wherein the target RSRP value is an RSRP value obtained by the receiver device by means of high layer filtering; and determining a target path loss value according to the target transmit power value and the current target RSRP value.

11 Claims, 4 Drawing Sheets

```
determining a target transmit power value according to at
least one transmit power value used in unicast sidelink     ── 101
communication with a receiver device

↓ receiving a current target reference signal received
power (RSRP) value returned by the receiver device          ── 102

↓ determining a target path loss value according to the
target transmit power value and the current target RSRP    ── 103
value
```

(56) References Cited

U.S. PATENT DOCUMENTS

2022/0295411 A1\* 9/2022 Fodor ................. H04W 52/262
2022/0361111 A1\* 11/2022 Lee ....................... H04W 52/14

FOREIGN PATENT DOCUMENTS

| JP | 2008258937 A | 10/2008 |
|----|---|---|
| WO | WO 2013155914 A1 | 10/2013 |
| WO | WO 2019011089 A1 | 1/2019 |

OTHER PUBLICATIONS

PCT/CN2019/116036 English translation of International Search Report dated Aug. 5, 2020, 2 pages.
Indian Patent Application No. 202247031753, Office Action dated Sep. 26, 2022, 6 pages.
European Patent Application No. 19951543.8, Search and Opinion dated Oct. 7, 2022, 11 pages.
LG Electronics "Discussion on physical layer procedures for NR sidelink", 3GPP TSG RAN WG1 Meeting #98bis, R1-1910783, Oct. 2019, 23 pages.
Samsung on Physical Layer Procedures for NR V2X 3GPP TSG RAN WG1 Meeting #98, R1-1908481, Aug. 2019, 20 pages.
Japanese Patent Application No. 2022-526228, Office Action dated May 9, 2023, 5 pages.
Japanese Patent Application No. 2022-526228, English translation of Office Action dated May 4, 2023.

\* cited by examiner

METHOD AND APPARATUS FOR ALLOCATING PATH LOSS FOR POWER CONTROL

CROSS-REFERENCE TO RELATED APPLICATION

This application is the US national phase application of International Application No. PCT/CN2019/116036, filed on Nov. 6, 2019, the entire contents of which are incorporated herein by reference.

TECHNICAL FIELD

The disclosure relates to the technical field of wireless communication, and in particular to a method and an apparatus for calculating a path loss for power control.

BACKGROUND

At present, in order to avoid interference to uplink communication of a user equipment when the user equipment performs sidelink communication, a transmit power value of the sidelink communication of the user equipment can be controlled according to a size of a downlink path loss. For example, when the user equipment moves to a position farther from a base station, the user equipment can perform the sidelink communication with a higher transmit power value, and when the user equipment moves to a position closer to the base station, the user equipment can perform the sidelink communication with a lower transmit power value. It can be seen that the transmit power value of the user equipment in sidelink communication may be a variable value.

Since the reference signal power value measured by the user equipment needs to be measured by the high layer, a weighted average of multiple measurement results in a long period of time is required. Different from the process of power control in the uplink communication process, in which the transmit power value of the base station is constant, in sidelink communication, the transmit power value used by the user equipment as the transmitting end is variable, it is difficult to obtain a correct path loss estimate based on the reference signal power value returned by the user equipment as the receiving end after high layer filtering, which will affect the effect of power control in sidelink communication.

SUMMARY

According to a first aspect of the disclosure, a method for calculating a path loss for power control is provided. The method is performed by a sender device of unicast sidelink communication, and includes:
  determining a target transmit power value according to at least one transmit power value used in unicast sidelink communication with a receiver device;
  receiving a current target reference signal received power (RSRP) value returned by the receiver device; wherein, the target RSRP value is an RSRP value obtained by the receiver device through high layer filtering;
  determining a target path loss value according to the target transmit power value and the current target RSRP value.

According to a second aspect of the disclosure, a sender device is provided, including:
  a processor;
  a memory configured to store instructions executable by the processor,
  wherein the processor is configured to:
    determine a target transmit power value according to at least one transmit power value used in unicast sidelink communication with a receiver device;
    receive a current target reference signal received power (RSRP) value returned by the receiver device; wherein, the target RSRP value is an RSRP value obtained by the receiver device through high layer filtering;
    determine a target path loss value according to the target transmit power value and the current target RSRP value.

According to a third aspect of the disclosure, a non-transitory computer readable storage medium is provided. The storage medium includes instructions stored thereon. When instructions stored in the storage medium are executed by a sender device, the method for calculating a path loss for power control described in the first aspect is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

Figure 1:
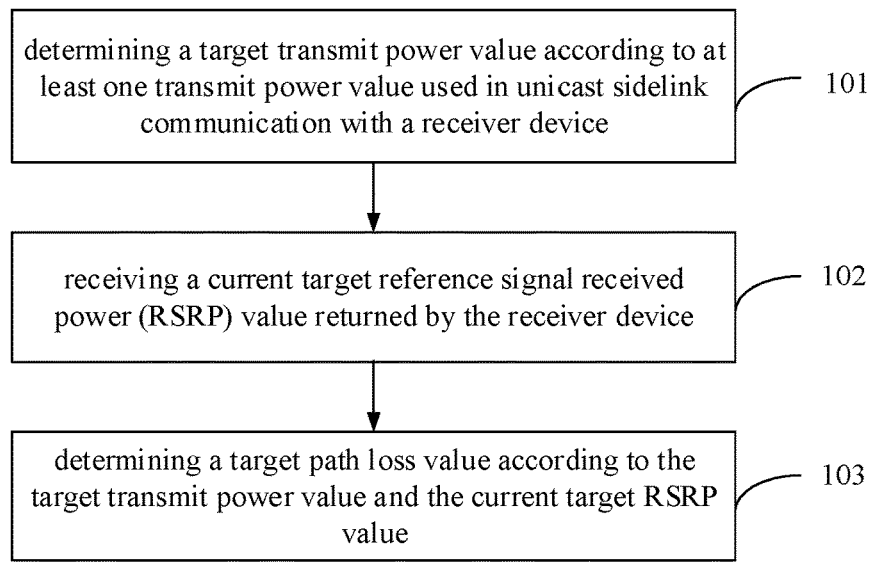
FIG. 1 is a flowchart of a method for calculating a path loss for power control according to an embodiment.

Embodiment of the present disclosure provide a method for calculating a path loss for power control, which can be applied to a sender device of a unicast sidelink communication. Referring to FIG. 1, which shows a method for calculating a path loss for power control according to an embodiment, the method may include the following steps.

In step 101, a target transmit power value is determined according to at least one transmit power value used in unicast sidelink communication with a receiver device.

In this step, the sender device may determine an equivalent target transmit power value according to at least one transmit power value adopted by itself when performing unicast sidelink communication with the receiver device.

In step 102, a current target reference signal received power (RSRP) value returned by the receiver device is received.

The target RSRP is the RSRP value obtained by receiver device through a high layer filtering, for example, layer 3 filtering. The target RSRP value $F_n$ may be calculated using the following formula:

$$F_n = (1-a) \times F_{n-1} + a \times M_n \quad \text{(formula 1)}$$

where, $F_n$ is the current RSRP value obtained by the receiver device using layer 3 filtering, that is, the target RSRP value, $F_{n-1}$ is the last RSRP value obtained by the receiver device using layer 3 filtering, $M_n$ is the latest physical layer measurement result of the receiver device, $a = \frac{1}{2}^{(k_i/4)}$, $k_i$ is a configured preset value.

The receiver device can calculate the target RSRP value using the above formula 1, and return it to the sender device through the sidelink.

In step 103, a target path loss value is determined according to the target transmit power value and the current target RSRP value.

In embodiments of the present disclosure, the sender device may determine and obtain the target path loss value according to the determined equivalent target transmit power value and the target RSRP value returned by the receiver device that is currently received.

In the above-mentioned embodiments, when determining the path loss for power control, the sender device can determine one target transmit power value according to at least one transmit power value used in unicast sidelink communication with the receiver device, and then determine the target path loss value according to the target transmit power value and the received current target RSRP value returned by the receiver device, which improves an accuracy of the target path loss value, thereby improving a power control effect of the sidelink communication, which can provide more reliable communication quality for the sidelink communication, and has a higher availability.

In an embodiment, the at least one transmit power value refers to at least one transmit power value of the sender device within a specified time period.

Here, since the target RSRP value obtained by the receiver device through the high layer filtering is a measurement result obtained after a period of time, in order to subsequently improve the accuracy of the target path loss value, the specified time period can be determined as the time period from the time point when the target RSRP value returned by the receiver device is received last time to the time point when the current target RSRP value returned by the receiver device is received. That is to say, the time period in which the sender device receives the target RSRP value twice in a row is regarded as the specified time period, and within this specified time period, the equivalent target transmit power value can be determined according to at least one transmit power value sent by the sender device.

In the above embodiments, the at least one transmit power value determined by the sender includes at least one transmit power value within the specified time period, and the at least one transmit power value within the specified time period is used to determine the target transmit power value, so that the target transmit power value is more accurate.

In an embodiment, the last transmit power value used before the current target RSRP returned by the receiver device is received is determined as the target transmit power value.

In embodiments of the present disclosure, among at least one transmit power value used when the sender device and the receiver device perform unicast sidelink communication, the last transmit power value used before the current target RSRP returned by the receiver device is received is determined as the target transmit power value For example, before receiving the current target RSRP returned by the receiver device, the sender device adopts four transmit power values of $P_1$, $P_2$, $P_3$ and $P_4$ respectively in chronological order, and can directly determine $P_4$ as the target transmit power value.

In an embodiment, an arithmetic mean value of the at least one transmit power values is calculated, and the arithmetic mean value is determined as the target transmit power value.

The sender device takes the arithmetic mean value of the at least one transmit power values of itself within the specified time period as the target transmit power value.

For example, within the specified time period, the sender device adopts four transmit power values of $P_1$, $P_2$, $P_3$ and $P_4$ respectively, then the target transmit power value $P = (P_1 + P_2 + P_3 + P_4)/4$.

Figure 2:
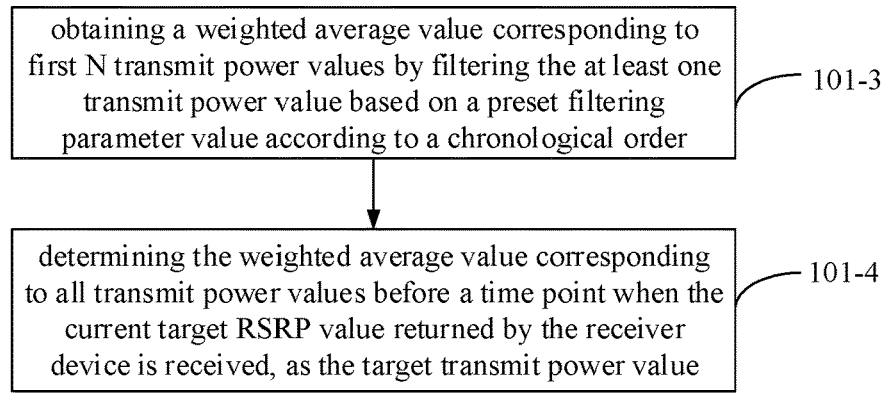
FIG. 2 is a flowchart of another method for calculating a path loss for power control according to an embodiment.

In an embodiment, referring to FIG. 2, which is a flowchart of another method for calculating a path loss for power control based on the embodiment shown in FIG. 1, step 101 may include steps 101-3 and 101-4.

In step 101-3, a weighted average value corresponding to first N transmit power values is obtained by filtering the at least one transmit power value based on a preset filtering parameter value according to a chronological order.

In this step, for the adopted at least one transmit power value, the sender device may filter each transmit power value based on the preset filtering parameter value according to the chronological order, to obtain the weighted average value corresponding to first N transmit power values.

In step 101-4, the weighted average value corresponding to all transmit power values before a time point when the current target RSRP value returned by the receiver device is received is determined as the target transmit power value.

In this step, by the time point when the current target RSRP value returned by the receiver device is received, the sender device may take the weighted average value corresponding to all transmit power values within the specified time period as the target transmit power value.

In an embodiment, the weighted average value $Q_n$ corresponding to the first N transmit power values in step 101-3 can be calculated by the following formula:

$$Q_n=(1-a')\times Q_{n-1}+a'\times P_n \quad \text{(formula 2)}$$

where, $Q_{n-1}$ is the weighted average value corresponding to the first N−1 transmit power values, a' is the filtering parameter value, and $P_n$ is the Nth transmit power value.

For example, according to the chronological order, the sender device has adopted four transmit power values of $P_1$, $P_2$, $P_3$ and $P_4$ in the specified time period. Assuming that a' is ½, the corresponding weighted average values are as follows:

$$Q_1=(1-a')\times Q_0+a'\times P_1=(\tfrac{1}{2})P_1,$$

$$Q_2=(1-a')\times Q_1+a'\times P_2=(\tfrac{1}{2})\times(\tfrac{1}{2})\times P_1+(\tfrac{1}{2})\times P_2=(\tfrac{1}{4})P_1+(\tfrac{1}{2})P_2,$$

$$Q_3=(1-a')\times Q_2+a'\times P_3=(\tfrac{1}{8})P_1+(\tfrac{1}{4})P_2+(\tfrac{1}{2})P_3,$$

$$Q_4=(1-a')\times Q_3+a'\times P_4=(\tfrac{1}{16})P_1+(\tfrac{1}{8})P_2+(\tfrac{1}{4})P_3+(\tfrac{1}{2})P_4$$

In embodiments of the present disclosure, the weighted average value $Q_4$ corresponding to all the transmit power values $P_1$, $P_2$, $P_3$ and $P_4$ may be used as the target power value P.

In the above-mentioned embodiments, before receiving the current target RSRP value returned by the receiver device, the last used transmit power value may be used as the target transmit power value, or the arithmetic mean value of at least one transmit power value may be directly used as the target transmit power value. Alternatively, the weighted average value corresponding to first N transmit power values may be obtained by filtering the at least one transmit power value based on the preset filtering parameter value according to the chronological order, and the weighted average value corresponding to all transmit power values before the time point when the current target RSRP value returned by the receiver device is received may be determined as the target transmit power value. Through the above ways, one target transmit power value can be determined, and the accuracy of the target path loss value can be improved, thereby improving the power control effect of the sidelink communication, which can provide more reliable communication quality for the sidelink communication, and has a high availability.

In an embodiment, for step 102, the following formula can be used to calculate the target path loss value PL:

$$PL=\text{Eff\_referenceSignalPower}-\text{higher layer filtered RSRP} \quad \text{(formula 3)}$$

where, Eff_referenceSignalPower is the target transmit power value, higher layer filtered RSRP is the currently received target RPRP value.

In the above embodiment, the difference between the target transmit power value and the current target RSRP value can be calculated, thereby obtaining the target path loss value, improving the accuracy of the target path loss value, thereby improving the power control effect of the sidelink communication, which can provide more reliable communication quality for the sidelink communication and has a higher availability.

Corresponding to the foregoing method embodiments implementing functions, the present disclosure further provides apparatus embodiments implementing the functions.

Figure 3:
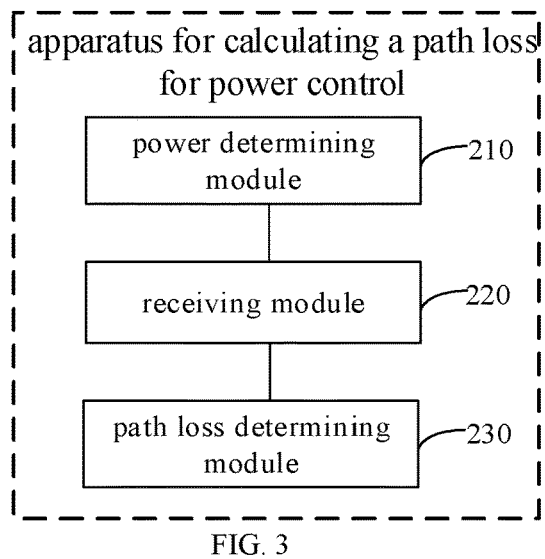
FIG. 3 is a block diagram of an apparatus for calculating a path loss for power control according to an embodiment.

Referring to FIG. 3, which is a block diagram of an apparatus for calculating a path loss for power control according to an embodiment, the apparatus is applied to a sender device of a unicast sidelink communication. The apparatus includes a power determining module 210, a receiving module 220 and a path loss determining module 230.

The power determining module 210 is configured to determine a target transmit power value according to at least one transmit power value used in unicast sidelink communication with a receiver device.

The receiving module 220 is configured to receive a current target reference signal received power (RSRP) value returned by the receiver device; wherein, the target RSRP value is an RSRP value obtained by the receiver device through high layer filtering.

The path loss determining module 230 is configured to determine a target path loss value according to the target transmit power value and the current target RSRP value.

In an embodiment, the at least one transmit power value includes at least one transmit power values within a specified time period.

In an embodiment, the specified time period includes:

a time period from a time point when a last target RSRP value returned by the receiver device is received to a time point when the current target RSRP value returned by the receiver device is received.

Figure 4:
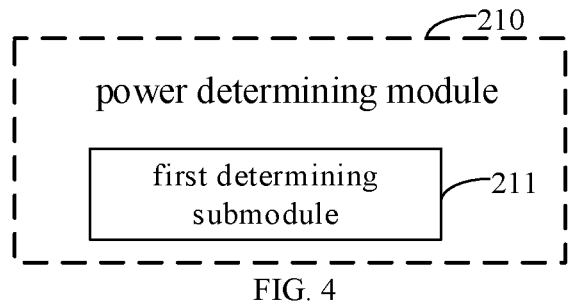
FIG. 4 is a block diagram of another apparatus for calculating a path loss for power control according to an embodiment.

Referring to FIG. 4, which is a block diagram of another apparatus for calculating a path loss for power control shown on the basis of the embodiment shown in FIG. 3, the power determining module 210 includes a first determining submodule 211.

The first determining submodule 211 is configured to determine a last transmit power value used before the current target RSRP returned by the receiver device is received, as the target transmit power value.

Figure 5:
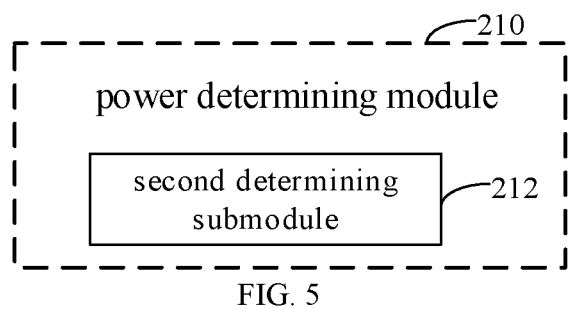
FIG. 5 is a block diagram of another apparatus for calculating a path loss for power control according to an embodiment.

Referring to FIG. 5, which is a block diagram of another apparatus for calculating a path loss for power control shown on the basis of the embodiment shown in FIG. 3, the power determining module 210 includes a second determining submodule 212.

The second determining submodule 212 is configured to calculate an arithmetic mean value of the at least one transmit power value, and determine the arithmetic mean value as the target transmit power value.

Figure 6:
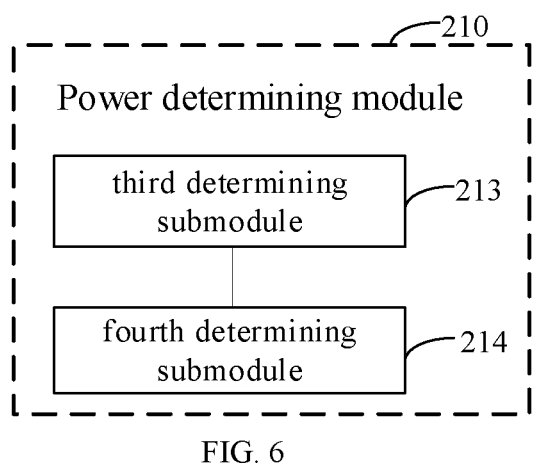
FIG. 6 is a block diagram of another apparatus for calculating a path loss for power control according to an embodiment.

Referring to FIG. 6, which is a block diagram of another apparatus for calculating a path loss for power control shown on the basis of the embodiment shown in FIG. 3, the power determining module 210 includes a third determining submodule 213 and a fourth determining submodule 214.

The third determining submodule 213 is configured to obtain a weighted average value corresponding to first N transmit power values by filtering the at least one transmit power value based on a preset filtering parameter value according to a chronological order.

The fourth determining submodule 214 is configured to determine the weighted average value corresponding to all transmit power values before a time point when the current target RSRP value returned by the receiver device is received, as the target transmit power value.

Figure 7:
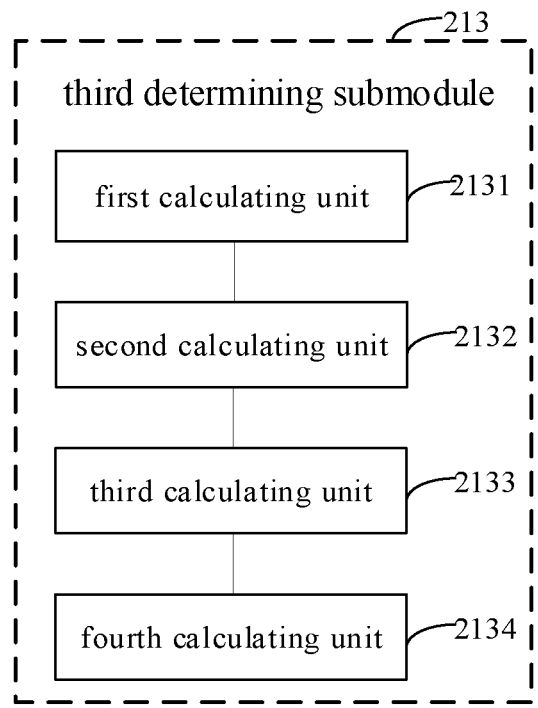
FIG. 7 is a block diagram of another apparatus for calculating a path loss for power control according to an embodiment.

Referring to FIG. 7, which is a block diagram of another apparatus for calculating a path loss for power control shown on the basis of the embodiment shown in FIG. 6, the third determining submodule 213 includes a first calculating unit 2131, a second calculating unit 2132, a third calculating unit 2133 and a fourth calculating unit 2134.

The first calculating unit 2131 is configured to calculate a first difference between 1 and the filtering parameter value.

The second calculating unit 2132 is configured to calculate a first product of the first difference and a weighted average corresponding to first (N−1) transmit power values.

The third calculating unit 2133 is configured to calculate a second product of the filtering parameter value and the Nth transmit power value.

The fourth calculating unit 2134 is configured to determine the weighted average value corresponding to the first N transmit power values as a sum of the first product and the second product.

Figure 8:
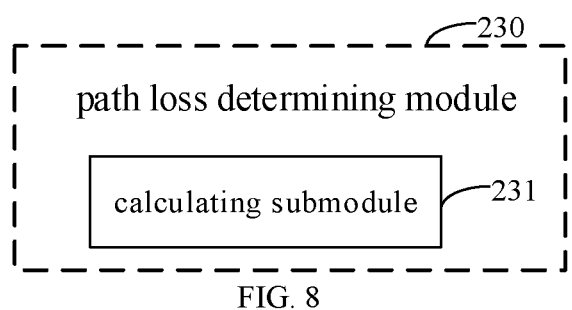
FIG. 8 is a block diagram of another apparatus for calculating a path loss for power control according to an embodiment.

Referring to FIG. 8, which is a block diagram of another apparatus for calculating a path loss for power control shown on the basis of the embodiment shown in FIG. 3, the path loss determining module 203 includes a calculating submodule 231.

The calculating submodule 231 is configured to obtain the target path loss value by calculating a difference between the target transmit power value and the current target RSRP value.

For the apparatus embodiments, since they basically correspond to the method embodiments, reference may be made to the partial descriptions of the method embodiments for related parts. The apparatus embodiments described above are only illustrative, wherein the units described as separate components may or may not be physically separated, and the components displayed as units may or may not be physical units, that is, they may be located in a local, or may be distributed over multiple network elements. Some or all of the modules can be selected according to actual needs to achieve the purpose of the solution of the present disclosure. Those of ordinary skill in the art can understand and implement it without creative effort.

Correspondingly, the present disclosure further provides an apparatus for calculating a path loss for power control, comprising:

a processor;

a memory configured to store instructions executable by the processor, wherein the processor is configured to:

determine a target transmit power value according to at least one transmit power value used in unicast sidelink communication with a receiver device;

receive a current target reference signal received power (RSRP) value returned by the receiver device; wherein, the target RSRP value is an RSRP value obtained by the receiver device through high layer filtering;

determine a target path loss value according to the target transmit power value and the current target RSRP value.

Figure 9:
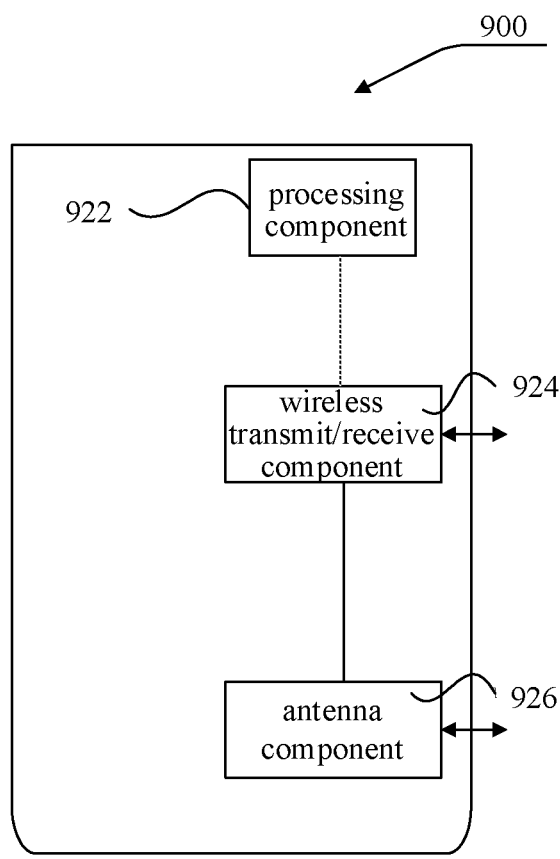
FIG. 9 is a block diagram of an apparatus for calculating a path loss for power control according to an embodiment.

As shown in FIG. 9, which is a block diagram of an apparatus 900 for calculating a path loss for power control according to an embodiment, the apparatus 900 may be provided as a sender device for unicast sidelink communication. Referring to FIG. 9, the apparatus 900 includes a processing component 922, a wireless transmit/receive component 924, an antenna component 926, and a signal processing portion specific to a wireless interface, and the processing component 922 may further include one or more processors.

One of the processors in the processing component 922 may be configured to perform any of the methods for calculating a path loss for power control described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for calculating a path loss for power control, performed by a sender device, comprising:

determining a target transmit power value according to at least one transmit power value used in unicast sidelink communication with a receiver device;

receiving a current target reference signal received power (RSRP) value returned by the receiver device; wherein, the target RSRP value is an RSRP value obtained by the receiver device through high layer filtering;

determining a target path loss value according to the target transmit power value and the current target RSRP value;

wherein determining the target transmit power value according to at least one transmit power value used in unicast sidelink communication with the receiver device, comprises:

obtaining a weighted average value corresponding to first N transmit power values of the at least one transmit power value, by filtering the at least one transmit power value based on a preset filtering parameter value according to a chronological order; and determining the weighted average value corresponding to all transmit power values before a time point when the current target RSRP value returned by the receiver device is received, as the target transmit power value.

2. The method of claim 1, wherein the at least one transmit power value comprises at least one transmit power value within a specified time period.

3. The method of claim 2, wherein the specified time period comprises:

a time period from a time point when a last target RSRP value returned by the receiver device is received to a time point when the current target RSRP value returned by the receiver device is received.

4. The method of claim 1, wherein obtaining the weighted average value corresponding to first N transmit power values by filtering the at least one transmit power value based on the preset filtering parameter value according to a chronological order comprises:

calculating a first difference between 1 and the filtering parameter value;

calculating a first product of the first difference and a weighted average corresponding to first (N−1) transmit power values;

calculating a second product of the filtering parameter value and the Nth transmit power value;

determining the weighted average value corresponding to the first N transmit power values as a sum of the first product and the second product.

5. The method of claim 1, wherein determining the target path loss value according to the target transmit power value and the current target RSRP value comprises:

obtaining the target path loss value by calculating a difference between the target transmit power value and the current target RSRP value.

6. A sender device, comprising:
a processor;
a memory configured to store instructions executable by the processor,
wherein the processor is configured to:
determine a target transmit power value according to at least one transmit power value used in unicast sidelink communication with a receiver device;
receive a current target reference signal received power (RSRP) value returned by the receiver device; wherein, the target RSRP value is an RSRP value obtained by the receiver device through high layer filtering;
determine a target path loss value according to the target transmit power value and the current target RSRP value;
wherein when determines a target path loss value according to the target transmit power value and the current target RSRP value, the processor is configured to:
obtain a weighted average value corresponding to first N transmit power values of the at least one transmit power value by filtering the at least one transmit power value based on a preset filtering parameter value according to a chronological order; and
determine the weighted average value corresponding to all transmit power values before a time point when the current target RSRP value returned by the receiver device is received, as the target transmit power value.

7. The sender device of claim 6, wherein the at least one transmit power value comprises at least one transmit power value within a specified time period.

8. The sender device of claim 7, wherein the specified time period comprises:
a time period from a time point when a last target RSRP value returned by the receiver device is received to a time point when the current target RSRP value returned by the receiver device is received.

9. The sender device according to claim 6, wherein the processor is configured to:
calculate a first difference between 1 and the filtering parameter value;
calculate a first product of the first difference and a weighted average corresponding to first (N−1) transmit power values;
calculate a second product of the filtering parameter value and the Nth transmit power value;
determine the weighted average value corresponding to the first N transmit power values as a sum of the first product and the second product.

10. The sender device of claim 6, wherein the processor is configured to:
obtain the target path loss value by calculating a difference between the target transmit power value and the current target RSRP value.

11. A non-transitory computer readable storage medium, comprising instructions stored thereon, wherein when instructions stored in the storage medium are executed by a sender device, a method for calculating a path loss for power control is implemented, the method comprising:
determining a target transmit power value according to at least one transmit power value used in unicast sidelink communication with a receiver device;
receiving a current target reference signal received power (RSRP) value returned by the receiver device; wherein, the target RSRP value is an RSRP value obtained by the receiver device through high layer filtering;
determining a target path loss value according to the target transmit power value and the current target RSRP value;
wherein determining the target transmit power value according to at least one transmit power value used in unicast sidelink communication with the receiver device, comprises:
obtaining a weighted average value corresponding to first N transmit power values of the at least one transmit power value, by filtering the at least one transmit power value based on a preset filtering parameter value according to a chronological order; and
determining the weighted average value corresponding to all transmit power values before a time point when the current target RSRP value returned by the receiver device is received, as the target transmit power value.

* * * * *